Aug. 12, 1924.
P. E. GOOD
1,504,620
METHOD AND APPARATUS TO STABILIZE REGULATORS
Filed Oct. 11, 1923
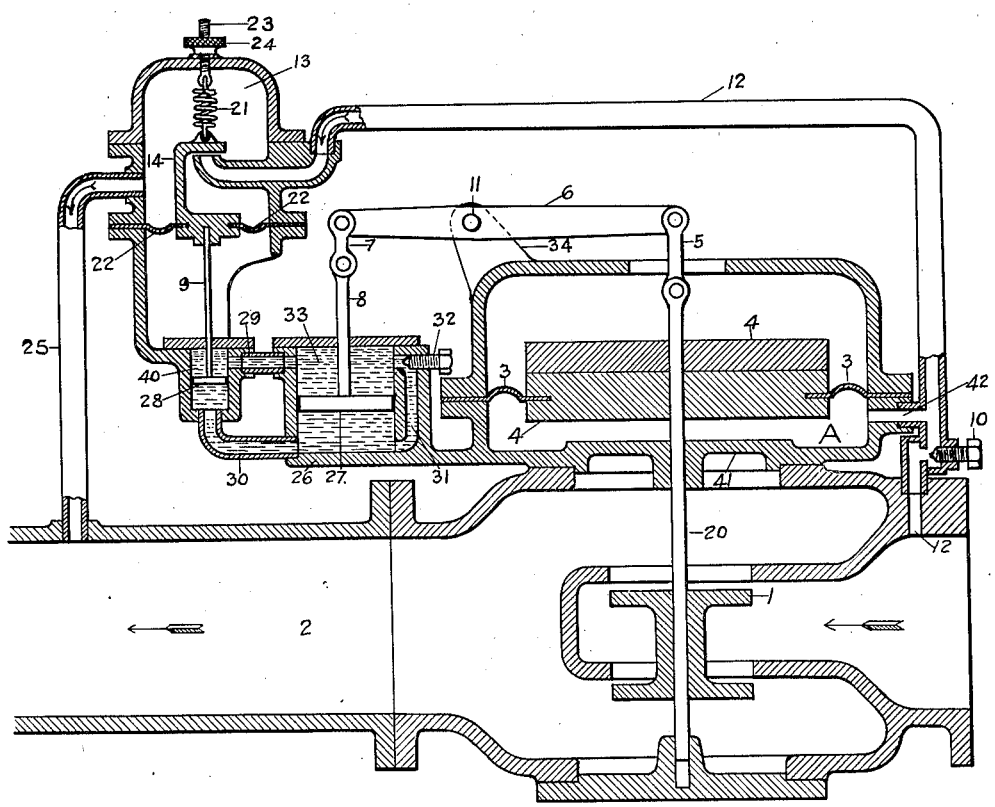
*Paul Eckert Good,*
INVENTOR.

Patented Aug. 12, 1924.

1,504,620

UNITED STATES PATENT OFFICE.

PAUL ECKERT GOOD, OF RIVERTON, NEW JERSEY.

METHOD AND APPARATUS TO STABILIZE REGULATORS.

Application filed October 11, 1923. Serial No. 668,025.

*To all whom it may concern:*

Be it known that I, PAUL ECKERT GOOD, a citizen of the United States, and resident of Riverton, county of Burlington, State of New Jersey, have invented certain new and useful Improvements in Methods and Apparatus to Stabilize Regulators, of which the following is a specification.

The general object of my invention relates to an improved method and means by which regulators are stabilized.

A more specific object of my invention is to provide effective means whereby a regulator is prevented from hunting and at the same time remains sensitive.

The various features of novelty characterizing my invention are pointed out with particularity in the claims annexed to and forming a part of this specification.

The accompanying figure is a vertical diagrammatic sectional view of one embodiment of my invention.

In the figure, 1 is a balanced valve controlling the flow of fluid in pipe 2. Valve 1 is operated by diaphragm 3, 3 loaded by weights 4, 4 by means of stem 20.

Pipe 12 leads the operating fluid to regulator 13. Valve 14 controls the flow of fluid passing through pipe 12. Diaphragm 22 responsive to the pressure of the fluid discharged through pipe 25, operates valve 14. Counterloading spring 21 for valve 14 is adjustable by means of screw 23 and nut 24. The fluid passing through regulator 13 is discharged by pipe 25. Screw 10 provides a point of throttling in pipe 12. 42 is a pipe leading fluid from pipe 12 under diaphragm 3, 3.

Stem 20 is connected by link 5 to lever 6 rocking on pin 11 held by support 34. Link 7 connects stem 8 of piston 27 of dash pot 26 to lever 6. Pipes 29 and 30 afford a passage for liquid 33 to flow at the top and bottom of cylinder 40. Piston 28 is connected by stem 9 to valve 14. 31 is a bypass for liquid 33 of dash pot 26 controlled as to its resistance to the flow of liquid 33 by screw valve 32.

Diaphragm 3, 3 with weights 4, 4 and diaphragm box 41 constitute the power element A operating valve 1 controlling the flow of fluid in pipe 2. Regulator 13 is the controlling element of the power element A. The regulator element and its power element combined constitute the regulating apparatus.

Under some conditions of pressure variation valve 14 of regulator 13 will vibrate and these vibrations will extend to the power element and to valve 1. This condition of instability is known as hunting. To prevent hunting I stabilize the regulating apparatus by means of the damping action of a first piston 27 displaced in a liquid 33 by the motion of valve 1 and also by the displacement of a second piston 28 which is connected to valve 14 and is subjected on either face to pressure differences generated in liquid 33 by piston 27. Piston 28 has no mechanical connection with power element A and is responsive to motion of valve 14 and is also responsive to the pressure difference created in liquid 33 when piston 27 is displaced by the rise or fall of diaphragm 3, 3.

Upward movement of diaphragm 3, 3 causes a downward travel of piston 27. Due to resistance of bypass 31 (adjusted suitably by screw valve 32) a pressure difference is created in liquid 33. This pressure difference is transmitted by the liquid in pipes 29 and 30 to piston 28 of cylinder 40. The pressure thus exerted on piston 28 pushes upward on regulator valve 14 tending to restore the valve to its original position. This opposing motion restores valve 14 to normal, thus stabilizing the operation of the regulating apparatus. When the regulated pressure departs from the amount for which the system is in balance the regulator valve 14 makes a quick response to such pressure change. The size of piston 28 can be made as small as desirable, compared with the size of piston 27, further the displacement of piston 28 being small, I obtain a very quick response to motion of valve 14. This result is desirable in order to obtain sensitive operation.

I have provided valve 14 with piston 28 and cylinder 40, which can be made as light as design justifies in order that the inertia of valve 14, stem 9 and piston 28 may be reduced.

I can proportion pistons 27 and 28 so that they are best suited for their specific purposes and I am able to correlate their operation as regards their motion by means of the pressure difference in liquid 33. Screw valve 32 is a means of adjustment of the pressure differences applied to piston 28.

Depending upon the relative sizes of pistons 27 and 28 I may obtain a motion of valve 14 for a motion of valve 1 and at the same time I may obtain as small a motion of valve 1 as to be entirely negligible for a motion of valve 14.

My stabilizing device permits of a complete correlation of regulator valve 14 to motions of valve 1 and to a transmission of motion of regulator valve 14 to valve 1 as reduced as desired.

The inverse action is obviously obtained if piston 27 is made smaller than piston 28.

My method of employing two mechanically independent dash pots containing a liquid responsive to the motion of both dash pot pistons permits to vary the amount of action or reaction transmitted by the power element to the regulator element and by the regulating element to the power element. One may be as large as desirable, the second as small as desirable, depending on the relative size of the dash pot pistons.

I do not wish to be limited to the type of regulator illustrated and described in this specification. My stabilizing method and apparatus apply to regulators having a regulating valve and a power element. It is immaterial if the fluid operating the regulating valve is the same as the fluid operating the power element.

From the foregoing it will be seen that I have invented a compound differential dash pot in which an effort applied to the liquid in one of the dash pots is transmitted to the other in a predetermined ratio and inversely.

I claim:

1. The method of stabilizing a regulator having a regulating element and a power element which consists in connecting each element to a liquid containing dash pot and interconnecting said dash pots so as to transmit the pressure differences generated in the liquid from one dash pot to the other.

2. The method of stabilizing a regulator having a regulating element and a power element which consists in connecting each element to a liquid containing dash pot, interconnecting said dash pots so as to transmit the pressure difference generated in the liquid from one dash pot to the other and proportioning the sizes of dash pots in such a manner that the pressure difference in each dash pot will transmit an action or reaction in a predetermined ratio on the other dash pot.

3. A stabilizer for a regulator having a regulating element and a power element comprising a first dash pot containing a liquid and connected mechanically to the regulating element, a second dash pot containing a liquid and connected mechanically to the power element and pipes interconnecting the liquid of both dash pots in such a manner that the pressure differences of the liquid are applied to the pistons of both dash pots.

4. A stabilizer for a regulator having a regulating element and a power element, comprising a first dash pot containing a liquid and connected mechanically to the regulating element, means to interconnect the liquid of the first dash pot to a second dash pot, a second dash pot mechanically connected to the power element and having a piston of such a size as compared with the piston of the first dash pot that the effort transmitted from the power element to the regulating element is in a given ratio to the effort transmitted by the regulating element to the power element.

PAUL ECKERT GOOD.